L. F. HAGGARDT.
ADJUSTABLE CANOPY FOR DRAFT ANIMALS.
APPLICATION FILED OCT. 17, 1910.
998,506.
Patented July 18, 1911.
3 SHEETS—SHEET 1.
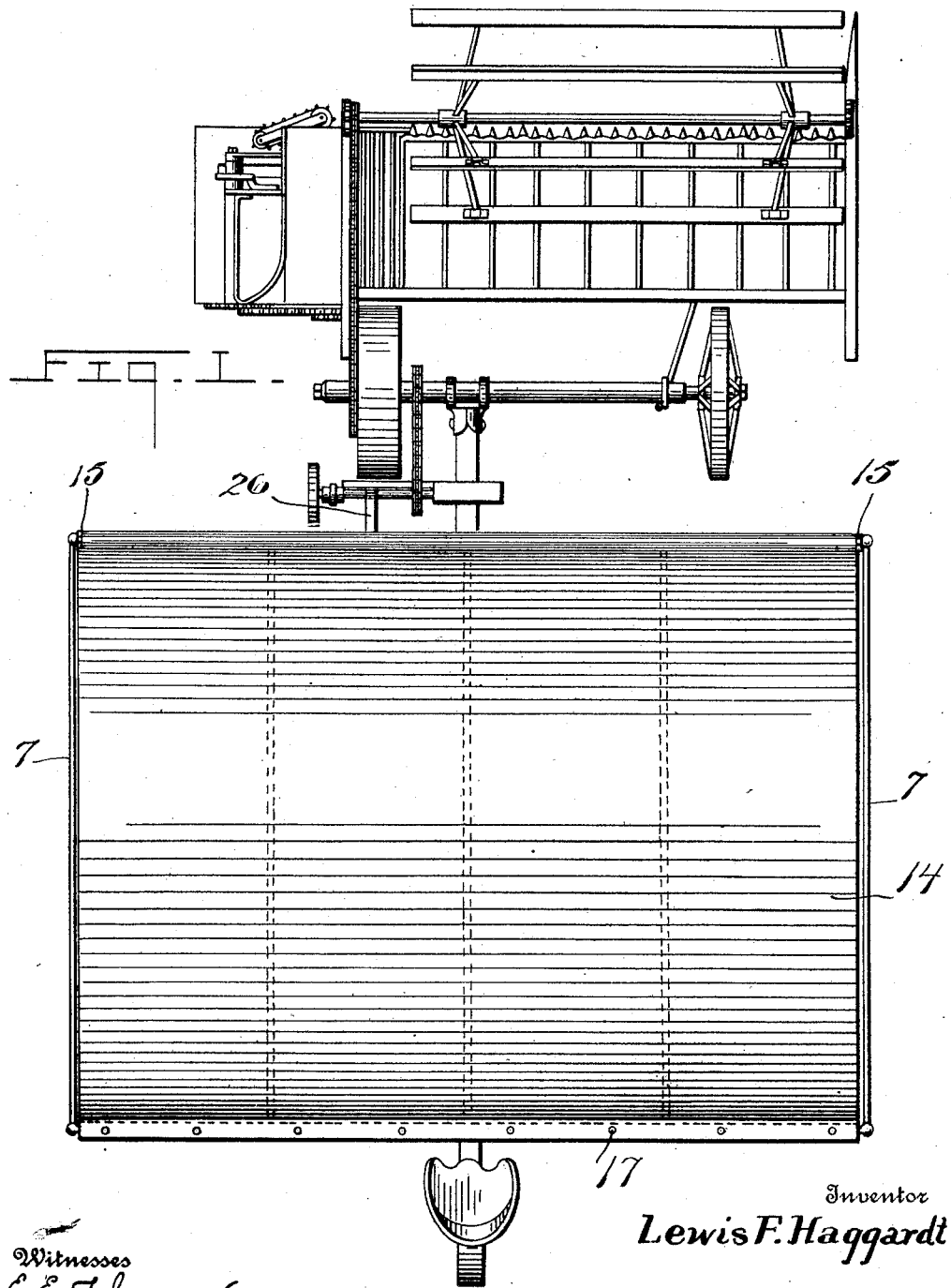
Witnesses
C. E. Johansen.
J. E. Burch.
Inventor
Lewis F. Haggardt
By Harry E. Chandlee.
Attorney

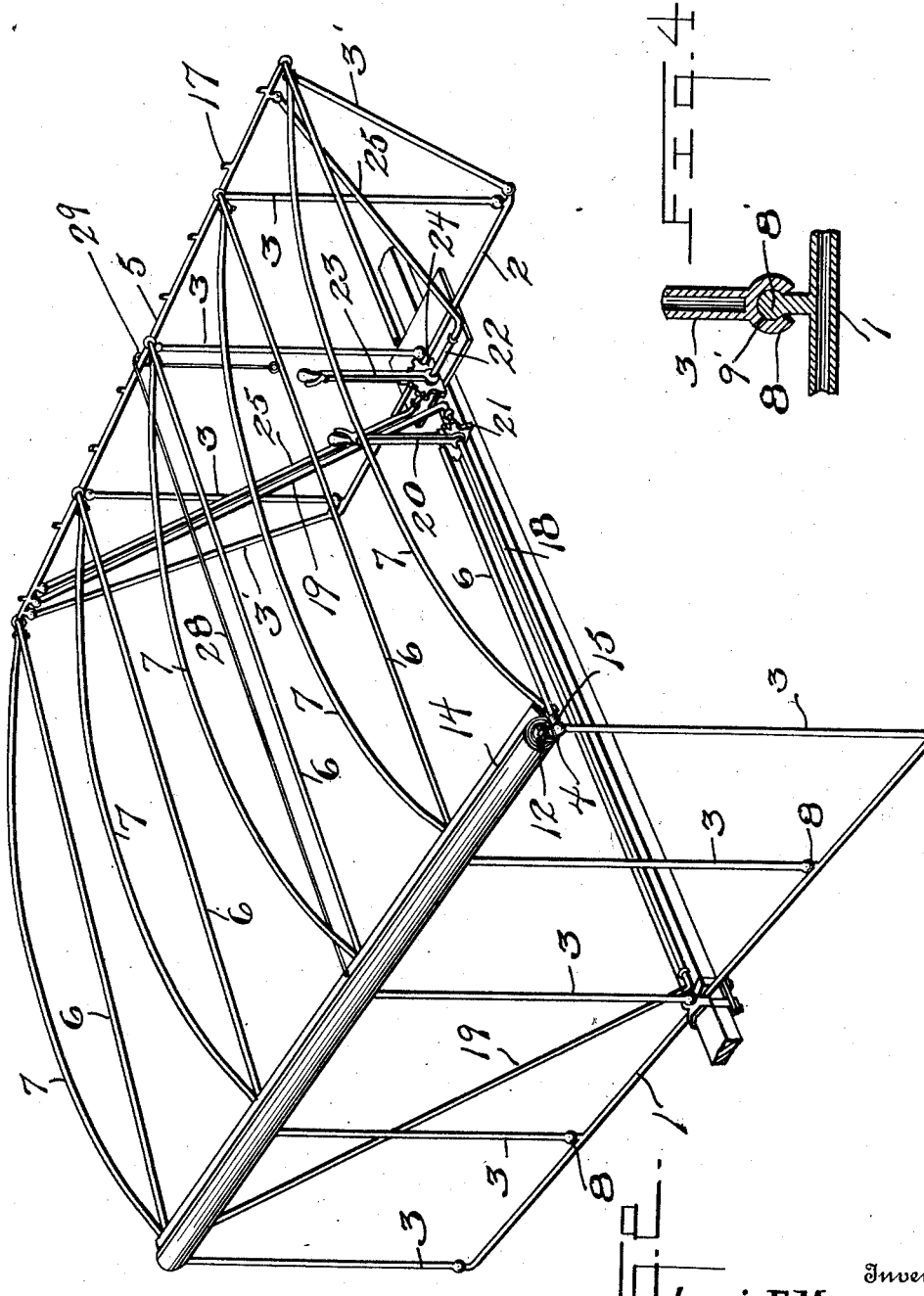

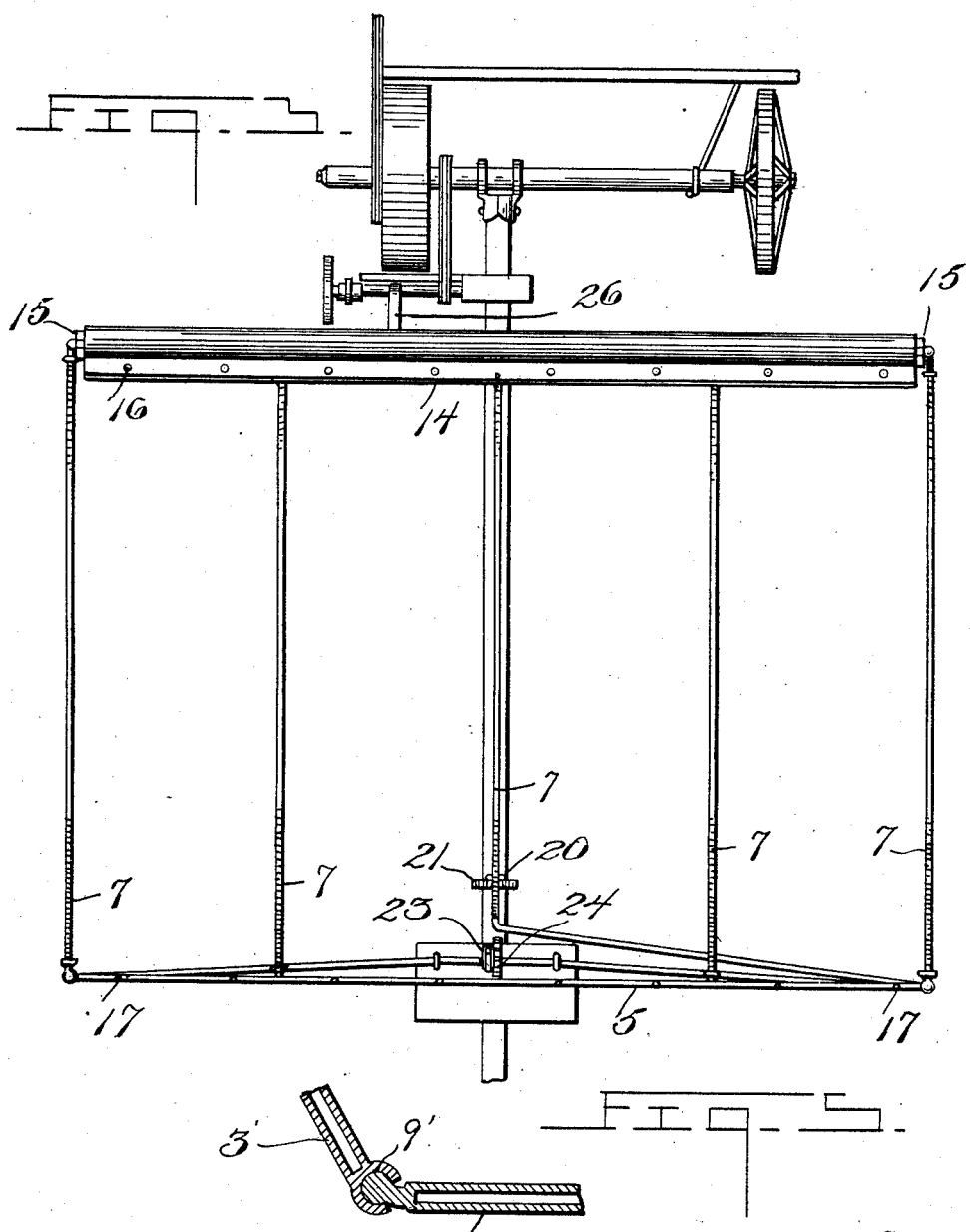

UNITED STATES PATENT OFFICE.

LEWIS F. HAGGARDT, OF AURORA, SOUTH DAKOTA.

ADJUSTABLE CANOPY FOR DRAFT-ANIMALS.

998,506.

Specification of Letters Patent. Patented July 18, 1911.

Application filed October 17, 1910. Serial No. 587,408.

*To all whom it may concern:*

Be it known that I, LEWIS F. HAGGARDT, a citizen of the United States, residing at Aurora, in the county of Brookings and State of South Dakota, have invented certain new and useful Improvements in Adjustable Canopies for Draft-Animals, of which the following is a specification.

This invention relates to adjustable canopies for draft animals and is especially devised for use in connection with a header or binder, to protect the animals from the heat of the sun.

The principal object of the invention is to provide a canopy for the purpose set forth, whereby it may be shifted in the proper direction to cover the animals at all times, according to relative position of the sun.

A further object is to provide a frame structure of novel construction which may be constructed so as to be very light and thereby obviate the necessity of conveying heavy and cumbersome structure in addition to the weight of the header or binder.

A still further object is to provide novel connections for shifting the canopy forwardly, backwardly or sidewise in connection with levers adapted to permit the holding thereof in their adjusted position.

Other objects and advantages will be apparent from the following description, and it will be understood that changes in the specific structure shown and described may be made within the scope of the claims without departing from the spirit of the invention.

In the drawings: Figure 1 is a top plan view of a binder with my improved canopy attached thereto, Fig. 2 is an enlarged perspective view of the canopy frame, Fig. 3 is a top plan view of the device and a portion of the binder, with the curtain wound upon its roller to more clearly show the manner of attaching the device to the binder, Fig. 4 is an enlarged detail sectional view showing the manner of joining the pivotal sections of the frame of the canopy, Fig. 5 is a view similar to Fig. 4, but showing the manner of attaching the rods to the ends of the bars.

Referring to the drawings in which like numerals indicate like parts throughout the several views, 1 designates the transverse forward supporting bar of the frame and 2 the rear bar of the frame to which the vertical rods 3 are secured as by means of ball and socket joints 8. The upper ends of the rods 3 are connected in a similar manner by the bars 4 and 5 for the forwardly and rearwardly disposed rods which are arranged at spaced parallel distances along the lengths of the respective bars, and also connected by the ball and socket joints 8 previously described so that said parts may have free swinging movement in any direction.

The outer rods 3' of the rear portion of the frame structure are extended from the ends of the bar 5 to the rear bar 2 which is preferably as much shorter at each end as the distance between two of the rods 3, so that the animals may readily turn without being obstructed by the outer rods. In forming the ball and socket joints, as is more clearly shown in Fig. 4 of the drawings the bars are provided with extensions having heads 8' thereon which are received within the sockets 9' formed upon the ends of the rods 3 and in instances where the rods 3' are connected to the bar 2, said bars are provided with similar heads at the end thereof as shown in Fig. 5 of the drawings. The respective pairs of rods 3 at the forward and rear ends of the frame are connected by the cross braces 6 in a similar manner and bowed rods 7 are also connected between said bars above the cross braces 6 so as to form a supporting surface for the curtain or canopy 14 which is wound upon a spring roller 12 rotatably mounted in brackets 15 secured to each end of the bar 4. The curtain 14 is adapted to be drawn over the bowed rods 7 and may be provided with a series of openings 16 along its free end adapted to engage with a series of buttons 17 projecting from the bar 5 so as to hold the curtain taut and insure the proper drainage of water therefrom if occasion requires.

In order that the canopy may be shifted forwardly, rearwardly and sidewise as before mentioned, I provide a shaft 18 which is pivotally mounted upon the tongue of the binder and has its end portions 19 extended upwardly and secured to the frame at the upper right-hand corners in the forward and rearward ends of the frame.

A lever 20 is rigidly secured to the shaft 18 and adapted to actuate upon the segmental rack 21 secured to the draft tongue as is more clearly shown in Fig. 3 of the drawings. This lever is adapted for shifting the frame sidewise and may be adapted for holding the same in an adjusted position by engagement of the spring dog of the lever with the rack bar. In order that the frame may be shifted forwardly and rearwardly, I provide a second shaft 22 which is journaled upon the driver's platform rearwardly of the lever 20 and has a lever and rack bar 23 and 24 respectively secured thereto and to the platform in a similar manner as that just described, and the shaft 22 is comparatively short so that the upwardly and outwardly extended arms 25 which are also connected to the rear bar 5 will not obstruct the movement of the draft animals and still permit the movement thereof through the medium of its connected lever.

In attaching the frame to the binder, the bar 1 is secured to the tongue of the binder and to a bracket or brace 26 carried by the binder rearwardly of the main gear, and the bar 2 is fastened to the tongue and driver's platform by means of suitable clamps, so that the canopy and frame will be securely held for all useful purposes. To further assist in drawing the curtain over the frame I may provide a cord 28 so that when the curtain is wound upon the roller it may be drawn over the frame without much trouble. The frame may be constructed of any suitable material to be as light as possible consistent with the greatest strength and the cord 28 is preferably disposed around a suitable pulley 29 carried by the bar 5 so as to permit free movement thereof.

Thus it will be seen that I have provided a very simple frame structure and canopy support for protecting draft animals from the heat of the sun and by reason of having the same adjustable, it may be shifted in any desired position, forwardly, rearwardly or sidewise to shade the animals at all times.

Having thus described my invention, what I claim is:

1. The combination with a wagon tongue, of parallel transverse bars secured thereto having upwardly projecting lugs, vertical supporting arms pivotally secured to said lugs, a frame pivoted to the upper ends of said rods, a cover for said frame, and means for swinging the frame laterally on its pivoted supporting rods.

2. The combination with a wagon, of transverse parallel rods secured thereto, said rods being formed with upstanding lugs terminating in enlarged rounded ends, vertical supports having sockets rotatably engaged on said rods, a frame pivotally secured to the upper ends of the supports, a covering for said frame, means for laterally shifting the frame on its pivotally held supports, and independent means for shifting the frame longitudinally of the tongue on said supports.

3. A device for the purpose set forth, comprising a series of vertical parallel spaced rods, said rods being provided with sockets at each end thereof, bars connecting the ends of said rods, said bars being provided with headed extensions movably engaged within said sockets, cross braces connecting the upper bars in a similar manner, a lever, a pivoted shaft to which said lever is secured and having arms connected to the ends of the upper bars at one side of the frame to permit sidewise movement thereof, a second shaft pivoted at right angles to the first named shaft and having extensions connected to the forward and upper bar or member and a lever connected to said shaft, for actuating the same.

4. The combination with a tongue, of transverse rods secured thereto, supports pivoted to the rods to permit of lateral and longitudinal pivotal movement with respect to the tongue, a frame pivoted to the upper ends of the supports, and means for laterally and longitudinally shifting the frame in its supports and for locking the frame in desired shifted position.

In testimony whereof I affix my signature, in the presence of two witnesses.

LEWIS F. HAGGARDT.

Witnesses:
F. C. AUSTIN,
H. A. REEVE.